Feb. 6, 1951     F. A. HAYES     2,540,730
OPERATION SERVO CONTROL FOR GROUP-STITCH SEWING MACHINES
Filed Oct. 7, 1948     5 Sheets-Sheet 1

INVENTOR.
Frank A. Hayes
BY William P. Stewart
ATTORNEY.

WITNESS
N. Lesgzak

INVENTOR.
Frank A. Hayes
BY William P. Stewart
ATTORNEY.

Feb. 6, 1951        F. A. HAYES        2,540,730
OPERATION SERVO CONTROL FOR GROUP-STITCH SEWING MACHINES
Filed Oct. 7, 1948        5 Sheets-Sheet 3

WITNESS
N. Leszczak

INVENTOR.
Frank A. Hayes
BY William P. Stewart
ATTORNEY.

Feb. 6, 1951  F. A. HAYES  2,540,730
OPERATION SERVO CONTROL FOR GROUP-STITCH SEWING MACHINES
Filed Oct. 7, 1948  5 Sheets-Sheet 4

INVENTOR.
Frank A. Hayes
WITNESS
N. Scoszak
BY
William P. Stewart
ATTORNEY.

Feb. 6, 1951   F. A. HAYES   2,540,730
OPERATION SERVO CONTROL FOR GROUP-STITCH SEWING MACHINES
Filed Oct. 7, 1948   5 Sheets-Sheet 5
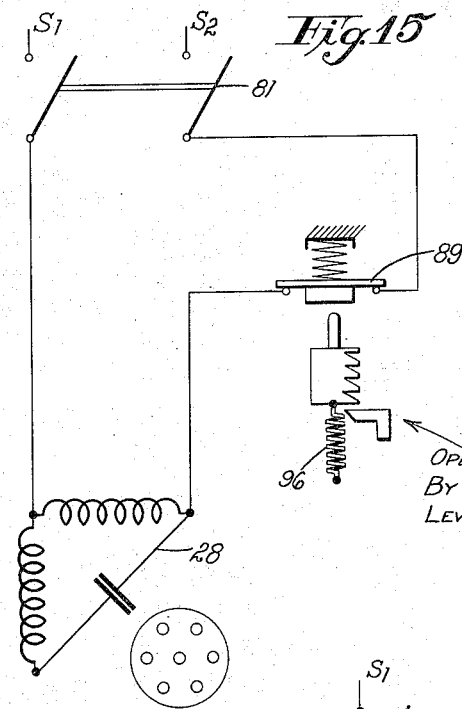
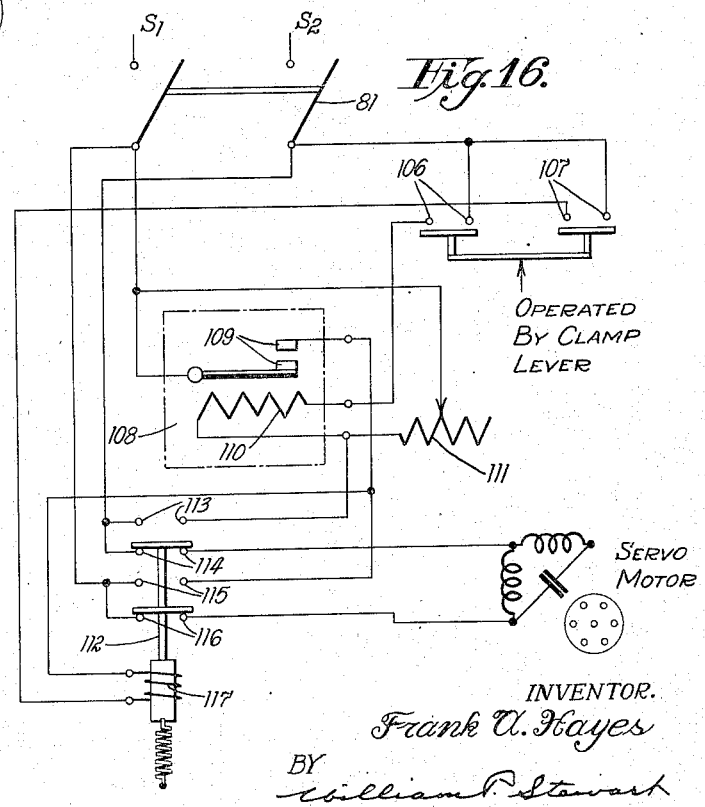
WITNESS.
N. Leszczak
INVENTOR.
Frank A. Hayes
BY
William F. Stewart
ATTORNEY.

Patented Feb. 6, 1951

2,540,730

UNITED STATES PATENT OFFICE 2,540,730

OPERATION SERVO CONTROL FOR GROUP-STITCH SEWING MACHINES

Frank A. Hayes, Middletown, N. J., assignor to The Singer Manufacturing Company, Elizabeth, N. J., a corporation of New Jersey Application October 7, 1948, Serial No. 53,268

12 Claims. (Cl. 112—67)

This invention relates to servo mechanisms and more particularly to the application thereof to the operation and control of group-stitch sewing machines.

A group-stitch sewing machine is characterized in that it performs a predetermined number and arrangement of sewing stitches on a work piece and is completely automatic, requiring an operator merely to load, start and unload the machine. As an example of a machine of this type, reference may be had to the U. S. Patent No. 738,591 which shows and describes a buttonhole stitching machine.

In machines of this type, heretofore, there have been two separate operator controls, one to lower the work-clamp and the other to start the stitching cycle. These have generally been foot-treadle operated controls and the frequency with which they have been required to be operated has produced much operator fatigue, which is a very real factor detrimental to the high production rates essential for this work.

Solenoids have been used for power operation of the machine controls. Aside from the fact that they are noisy, the objection to solenoids, particularly of the alternating-current type, is that they are essentially an "all on" or "all off" type of device whereas, for satisfactory work-clamp operation, it should be possible to move the clamp to and hold it at any intermediate position, and this without requiring any substantial effort on the part of the operator.

It is, therefore, a primary object of this invention to provide operating controls for a group-stitch sewing machine, which controls shall be quiet in operation, require a minimum of operator effort, and be proportional in response. By "proportional in response" is meant that the amount of clamp movement is substantially proportional to the pressure exerted by the operator on the control.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
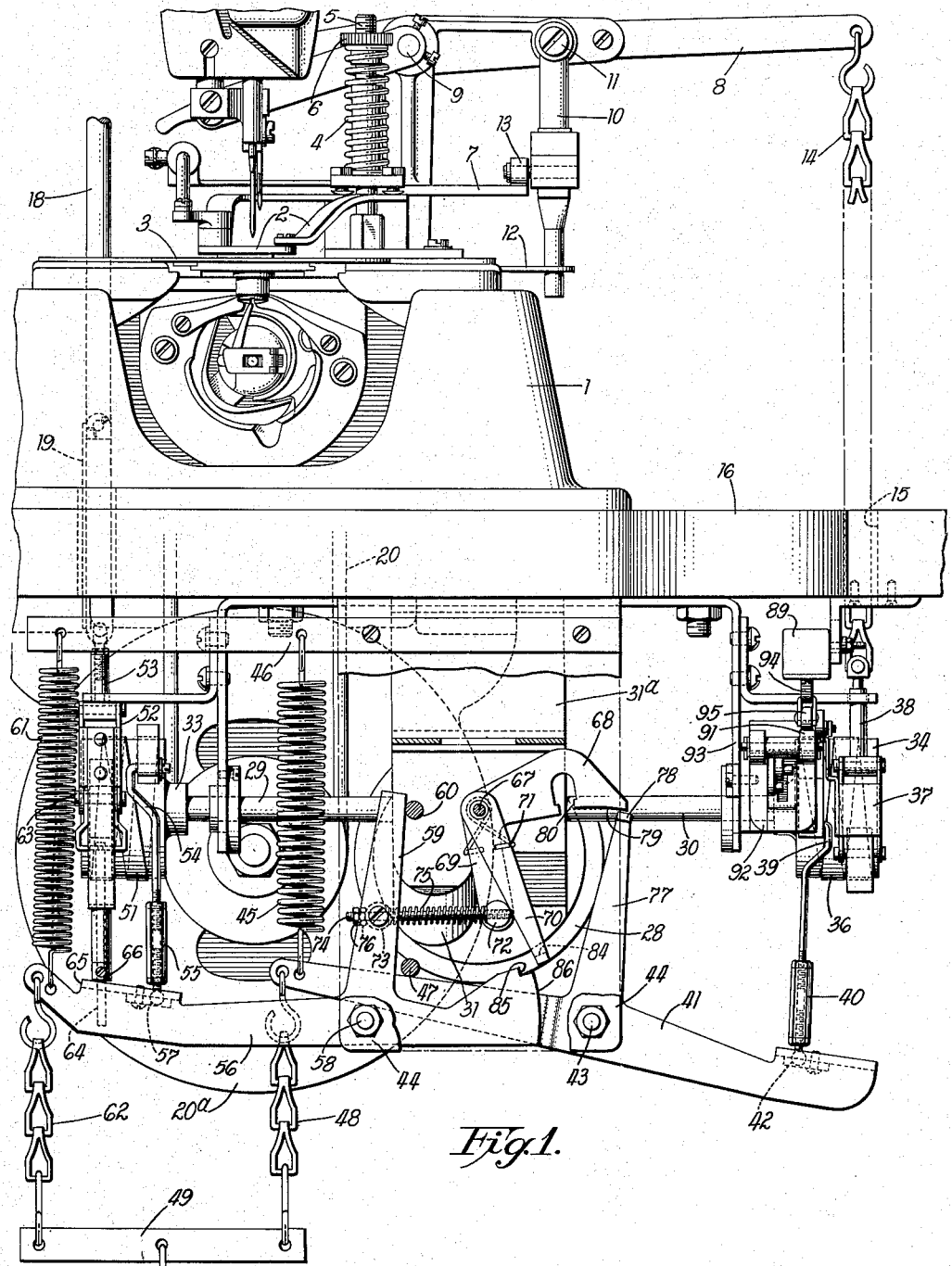
Fig. 1 is a front end elevation, partly in section, of a portion of a buttonhole stitching machine showing a servo control mechanism embodying the invention.

Figs. 9 through 14 inclusive show different operating positions of parts of the mechanism of Fig 1.

Fig. 15 is a schematic diagram showing the electrical connections to the servomotor.

Fig. 16 is a schematic diagram showing a modified circuit for electrically connecting the servomotor to its supply lines.

Referring to Fig. 1, 1 denotes the bed of a buttonhole stitching machine of a well known type, such, for example, as that shown and described in the U. S. Patent No. 738,591 of Sept. 8, 1903, and to which reference may be had for a complete description thereof.

A work-clamp 2 is normally held down against a work-plate 3 by a compression spring 4 which surmounts a stud 5 secured to the bed 1. The pressure exerted by the spring 4 on the clamp 2 is varied by adjustment of a thumb nut 6. The work-clamp 2 is hinged (not shown) so that downward movement of plate 7 causes the clamp to be lifted from the work-plate 3. A clamp lever 8, pivoted at 9, carries a strut 10, hinged at 11, and guided for vertical movement by traversing an aperture in plate 12.

Secured to the strut 10 is a cam roller 13 which cooperates with the plate 7 to raise and lower the clamp 2 in response to movement of the lever 8 as imparted thereto by a chain 14 which is secured to the end of the lever 8 and extends vertically downward through an apertured portion 15 of the top of a table 16.

Figure 7:
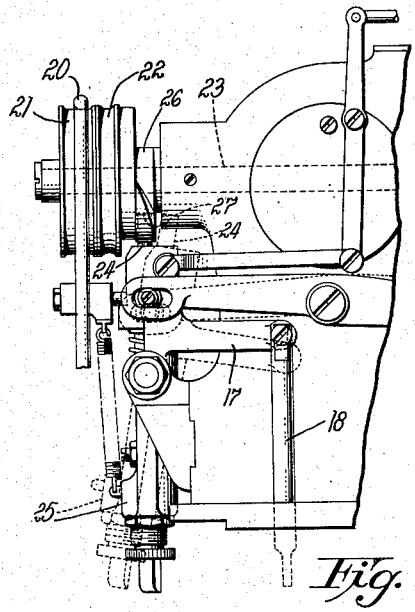
Fig. 7 is a fragmentary side elevation of the pulley end of the machine of Fig 1.
Figure 3:
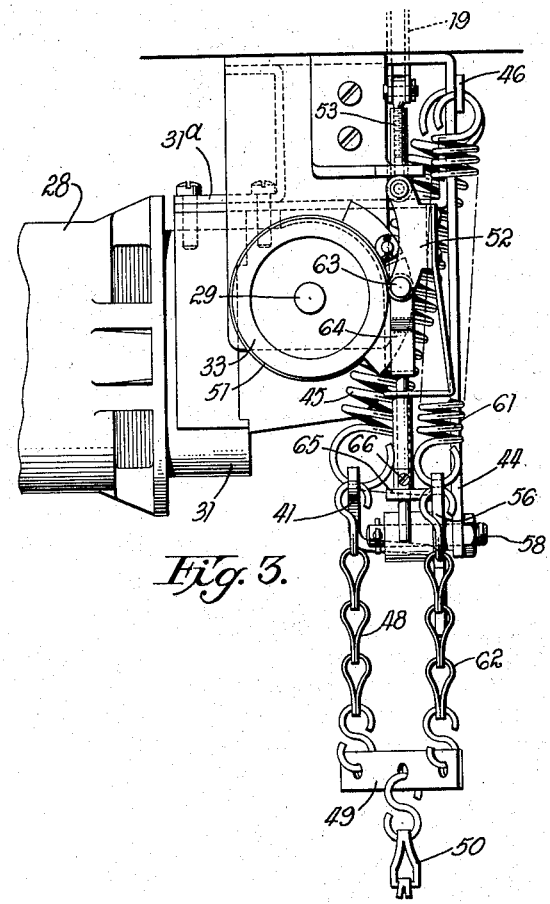
Fig. 3 is a side elevation looking in the direction of arrows 3—3 of Fig. 2.
Figure 8:
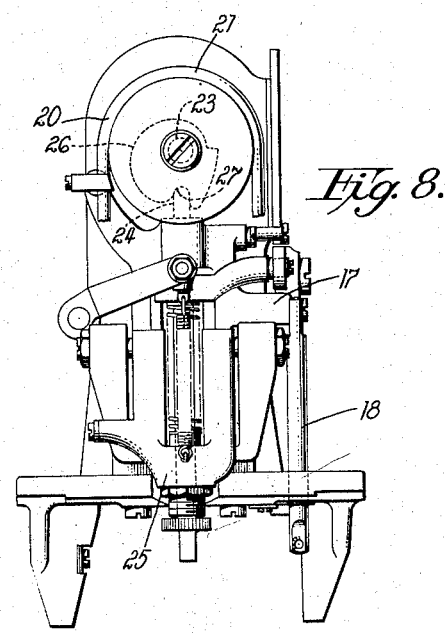
Fig. 8 is a rear end elevation of the machine of Fig. 1.

A starting lever 17, seen best in Figs. 7 and 8, is actuated by a rod 18 secured to one end thereof and connected to a link 19 which extends through an apertured portion of the table 16. Operation of lever 17 in a clockwise direction and against a bias spring not shown, shifts a driving belt 20 connected to a driving motor 20ᵃ, from a free running pulley 21 to a pulley 22 fastened to a main shaft 23 of the buttonhole machine. At the same time, a cam finger 24 carried by a stop-motion lever 25 is moved out of engagement with a stop cam 26 fixed to the shaft 23. Thus, the machine comes up to speed and completes a work cycle, at the end of which the lever 25 is automatically returned to the position in which the cam finger may be cammed into a notch 27 on the stop cam 26. The belt is shifted to the free pulley and the machine comes to a positive stop.

The structure set forth above is well known in the prior art and the chain 14 and the link 19 are ordinarily connected to suitable foot-treadles for direct control by the operator.

Now, there will be described servo control means for controlling the work-clamp 2 and the starting lever 17 from a single foot-treadle and with minimum effort requirement.

A separate motor 28, preferably of the constant speed induction type is connected to drive shafts 29 and 30 through a flange-connected speed-reducing gear-box 31 which is secured to the table 16 by means of a clamp 31ª.

Figures 2, 4, 5, 6:
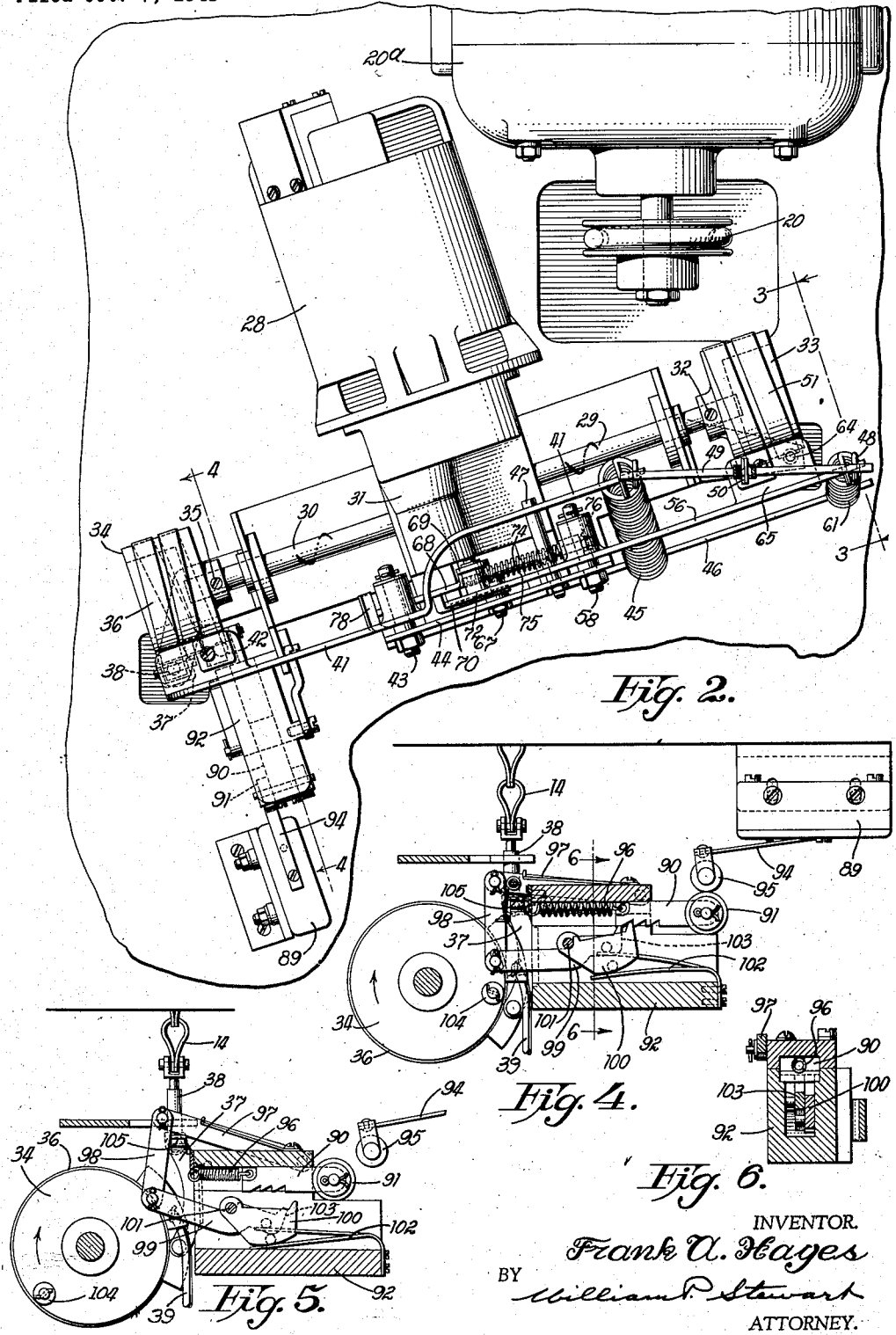
Fig. 2 is an under-the-table plan view of the servo mechanism of Fig. 1.
Fig. 4 is a section, partly in elevation, taken on line 4—4 of Fig. 2.
Fig. 5 is the same view as Fig 4 except that part of the mechanism has been moved to illustrate the operation thereof.
Fig. 6 is a section taken on line 6—6 of Fig. 4.

Secured to the shaft 29 by means of a set-screw 32 is a drum 33, which, when the motor 28 is running, rotates in the direction indicated by the arrow in Fig. 2. Likewise, the shaft 30 carries a drum 34 secured thereto by means of a set-screw 35 and rotates as indicated by the arrow.

Wound around the drum 34 is a steel band 36, connected at one end, by a link 37, to a plunger 38 which, in turn, is connected to the lower end of the chain 14. The other end of the band 36 engages a hook portion 39 of an adjustable link 40 which is secured to a lever 41 by means of a ball-and-socket joint 42.

The lever 41 is pivoted at 43 in a frame 44 secured to the table 16. The opposite end of the lever 41 is connected to a spring 45 which is anchored in a bar 46 carried by the table. This spring 45 provides a bias force on the lever 41 tending to maintain it in its extreme clockwise position against a stationary stop-pin 47 as shown in Fig. 1. Also secured to the spring end of the lever 41 is a chain 48, the lower end of which is connected to an equalizer link 49. A chain 50 is connected from the middle of said equalizer link 49 to a foot treadle (not shown) so that, by pressing downward on the foot treadle, a counterclockwise movement is imparted to the lever 41.

Wound about the drum 33, is a steel band 51 connected at one end to a band link 52 which, in turn, is connected through an adjustable link 53 to the link 19 and thence to the rod 18 which controls the starting lever. The other end of the band 51 engages the hook-portion 54 of an adjustable link 55 which is secured to a lever 56 by means of a ball-and-socket joint 57.

The lever 56 is pivoted at 58 in the frame 44, and is formed with an upstanding arm 59 which engages a stationary stop-pin 60 to limit the extreme clockwise position of the arm 56. A spring 61 is connected to one end of the lever 56 and is anchored in the fixed bar 46. A chain 62 connects the spring end of the lever 56 with the equalizer link 49 at the end thereof opposite to that at which the chain 48 is connected. Attached to the band link 52 by means of pin 63 is a forked rod 64 which is free to slide in an apertured portion of a flange 65 of the lever 56 except as restrained by a collar 66 which is slidably adjusted on the forked rod 64.

Pivoted to the frame 44 at 67 is a labyrinth latch 68 having a downwardly projecting arm 69. Also pivoted at 67 is a second latch 70 which is urged clockwise with respect to the labyrinth latch 68 by a torsion spring 71 and is stopped in the position shown in Fig. 1 by the cylindrical head of a trunnion 72 which is pivotally connected to the arm 69. This trunnion 72 is connected to a similar trunnion 73 in the arm 59 by a rod 74 which is threaded into or otherwise secured to the trunnion 72 but is free to slide in the trunnion 73. Between trunnions 72 and 73 is a compression spring 75 tending to urge them apart by a fixed distance which can be adjusted by nuts 76. Parts 72, 73, 74 and 75 form a compressible link joining the lever 56 and the latch 68 so that counterclockwise movement of the lever 56 imparts clockwise movement to the latch 68. On the other hand, clockwise movement of the lever 56 does not necessarily impart counterclockwise movement of the latch 68, as the spring 75 can compress allowing the rod 74 to slide through the aperture in the trunnion 73.

The lever 41 has an upstanding arm 77, the tip of which is bent over to form a detent 78, as shown best in Fig. 2. This detent 78 extends under the end of the latch 68, which has a surface 79 formed in the shape of a circular arc about the pivot 43. Thus, in the position shown in Fig. 1 and in any position of the detent 78 except opposite opening 80, the latch 68 is prevented from moving clockwise by the detent 78 and hence, due to the rod 74 and the nuts 76, the lever 56 is also held against counterclockwise movement.

The latch 70 is formed with a detent 84 adapted to engage a notch 85 in the arm 56 as will be seen.

The conditions shown in Fig. 1 exist when the foot treadle (connected to the chain 50) is raised, the servomotor 28 is turned off, and the work-clamp 2 is lowered. When the servomotor is turned on, due to the fact that the band 36 is snubbed tightly around the drum 34 by the spring 45, the chain 14 is pulled down, imparting a clockwise movement to the arm 8 and lifting the work-clamp 2. The machine is now ready to operate.

Operation

After the work is inserted between the work-clamp 2 and the work-plate 3, the operator presses down on the foot-treadle, which through the link 49 and chains 48 and 62, starts the levers 41 and 56 to turn counterclockwise. This movement of the lever 41 raises the link 40 which loosens the band 36 on the drum 34, thus preventing any torque transmission from the servomotor 28 to the band. The spring 4 then forces the work-clamp 2 down on the work ready for the stitching cycle. It will be noticed that, for smaller treadle movement, proportionally less loosening of the band is provided which is translated as less movement of the work-clamp. Thus the operator maintains full control of the clamp.

It is essential that the clamp be fully seated upon the work before the stitching begins and how this sequential operation is accomplished with a single foot-treadle will now be described.

Figure 9:
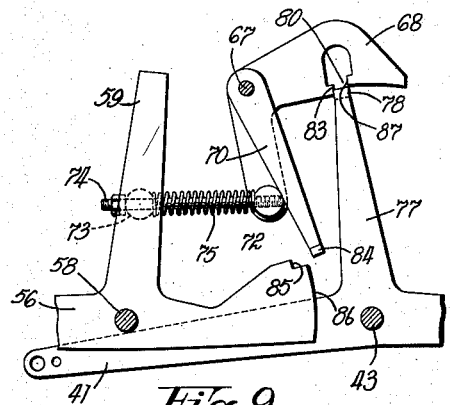

When the foot-treadle is about half depressed, the levers 41 and 56, and the latch 68 are in the positions shown in Fig. 9 with the detent 78 stopped by an abutment 83 on the latch 68 and ready to enter the gap 80.

Further downward movement of the treadle rocks the lever 56 counterclockwise which, through link 74, rocks latch 68 clockwise. The detent 78 enters the gap 80 and a detent 84 on the latch 70 just misses a notch 85 in the arm 56 and rides on the surface 86 as is seen best in Fig. 10.

Counterclockwise movement of the lever 56 pulls down on link 55 and tightens the band 51 on the drum 33. Torque is transmitted to the band from the drum, and through the links 52, 53, 19 and rod 18 effecting actuation of the starting lever 17 to start the machine, as is shown by the dotted lines in Fig. 7. The machine automatically latches the lever 17 in the starting position during the stitching cycle, thus holding the link 52 and rod 64 down.

Figure 10:
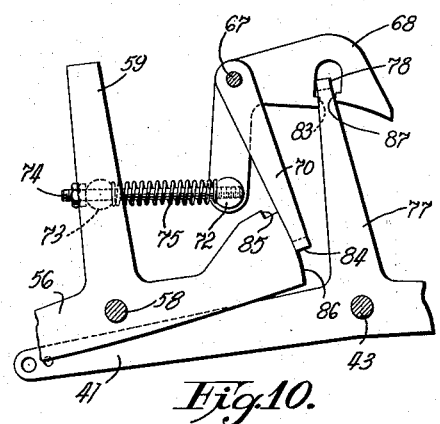
Figure 11:
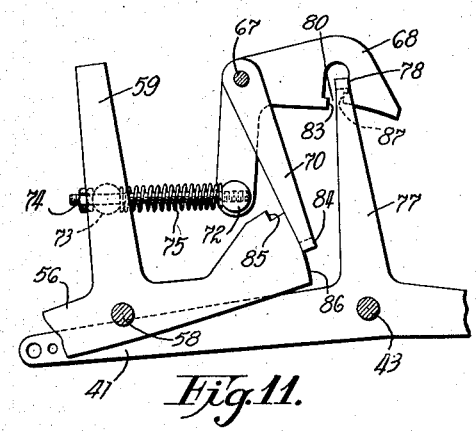

While the pressure on the treadle persists, it exerts counterclockwise torque on the lever 41 and the positions of the parts are as shown in Fig. 10.

As soon as the machine starts, the operator releases the treadle. Spring 61 then pulls lever 56 clockwise to the extent allowed by the collar 66, thus loosening the band 51 on the drum 33 and allowing the spring 61 to act on the collar 66, which cannot rise however, due to the latching of the lever 17 as previously explained.

Similarly, the spring 45 tries to move the lever 41 clockwise, but the latch 68 permits only slight movement of this lever which has no effect on the work-clamp. The mechanism is now in the position shown in Fig. 11.

Figure 12:
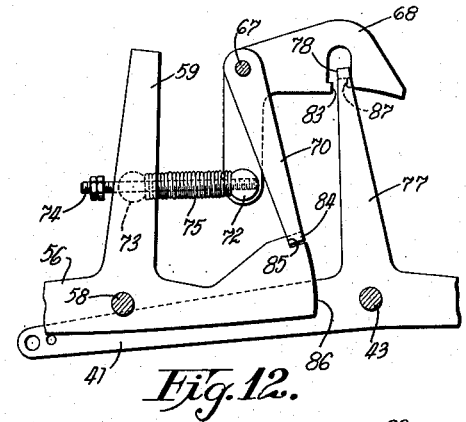

When the machine has completed the stitching cycle, the lever 17 is released and returns to its stop position. The links 52, 53, 19 and rod 18 rise and the lever 56 continues its clockwise movement to its extreme position with the arm 59 against the stop 60. The latch 68, however, cannot follow this movement because the detent 78 catches on a lip 87 and the spring 75 compresses and the detent 84 drops into the notch 85, thus locking the lever 56 in the off position as shown in Fig. 12.

Figure 13:
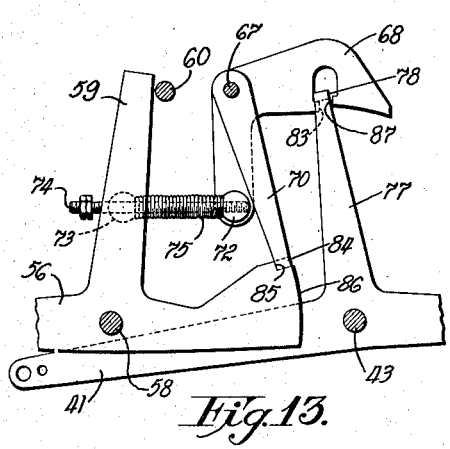
Figure 14:
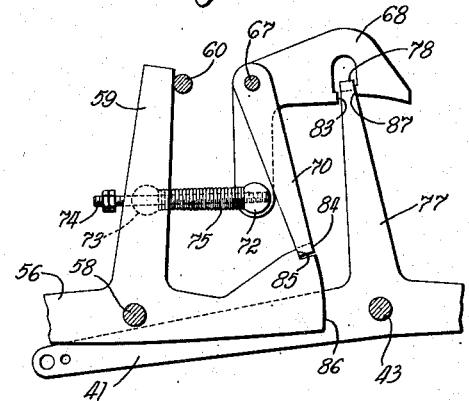

In order to raise the work-clamp, the operator pushes down on the treadle slightly and then releases it. Pushing the treadle down moves the lever 41 counterclockwise and moves the detent 78 from the right side of the notch in the latch 68 to the left side where it engages a lip formed by the abutment 83, as shown in Fig. 13. This lip is lower down, i. e., nearer to the pivot 43 than the lip 87. Thus, when the treadle is released and the lever 41 moves clockwise, the detent 78 hits the face of the lip 87 as shown in Fig. 14 and this allows the latch 68, urged by the spring 75 to swing clear of the detent 78, whereupon the trunnion 72 hits the latch 70 knocking the detent 84 free of the notch 85. The lever 41 then moves clockwise under the action of the spring 45, the band 36 is applied to the drum 34, the clamp 2 rises and the work cycle is completed.

The operator thus has complete control of all operations with a single operating treadle and, due to the servos which take all but a small percentage of the load from the machine levers, these operations are practically effortless.

The effort required depends upon the number of wraps the band makes around the servo drum. With a wrap of 720 degrees or two revolutions as shown and a coefficient of friction of .2, which is quite conservative, the ratio of the pull the operator puts on the servo band to that on the machine levers is 1 to 11.

It is desirable to automatically turn off the servomotor 28 in the event that the machine is left with the motor running and the clamp up. Two types of control for doing this will now be described.

The first type employs a switch 89 which is actuated by a rack 90 and roller 91 responsively to a fixed number of rotations of the drum 34 in the "clamp up" position. Referring to Figs. 4, 5 and 6, a housing 92 is secured to a bracket 93 (Fig. 1) fixed to the table 16. Slidably mounted within the housing is the rack 90 and the roller 91. The switch 89 carries an operating leaf 94 with a roller 95. When the rack is in its extreme right hand position as shown in Fig. 4, the roller 91 lifts the roller 95 to open switch 89 which, as seen in the circuit diagram of Fig. 15, disconnects the motor 28 from the supply S1—S2. A bias spring 96 normally holds the rack and roller out of contact with the switch roller 95, the switch 89 being closed in this condition. A linkage comprising links 97, 98 and 99 are pinned together as shown. A latch 100 is pivoted to the housing at 101 and is biased upwardly by a leaf spring 102. The end of link 99 is formed with a pawl 103 adapted to engage the teeth of the rack 90 in a position of the linkage as shown in Fig. 4. This position is with the work-clamp 2 raised and, for each revolution of the drum 34, a roller 104 mounted thereon drives link 98 to the right and moves the rack over one tooth to the right. It will be seen that, after three revolutions (corresponding to the three teeth in the rack 90) in the "clamp up" position, the switch 89 is operated to shut off the motor 28. It is assumed that the line switch 81 is closed during these operations.

If, however, the clamp 2 is lowered as for stitching, and as shown in Fig. 5, the linkage is raised by engagement with the link 97 of a detent 105 on link 37. This throws the pawl 103 out of mesh with the teeth of the rack 90 and at the same time depresses the latch 100 so that the rack is free to return to its normal position urged by the spring 96 and the switch 89 closes to connect motor 28 to the supply S1—S2.

A second shut-off control for the servo-motor 28 is largely electrical, and the circuit therefor is shown in Fig. 16. Two separate switches 106 and 107 are operated simultaneously and responsively to the position of the clamp 2. That is to say, when the clamp is raised, the switches close and when the clamp is lowered, the switches open. A heater type relay 108 has contacts 109 and heater element 110. A variable resistance 111 is connected in series with the heater element 110 to control the current therethrough. A double-pole, double-throw relay 112 has contacts 113, 114, 115, 116, and an operating coil 117 and is shown in its normal unexcited position.

In operation, if the operator raises the clamp 2, the switches 106 and 107 close. Assuming that the line switch 81 is closed, switch 106 puts current from supply lines L1 and L2 through the heater element 110 and resistance 111. After a time predetermined by the setting of resistance 111, contacts 109 close and apply voltage to the operating coil 117. Relay 112 operates to open contacts 114 and 116 and close contacts 113 and 115. This disconnects the servomotor 28 from the line and provides a short circuit for the heater element 110 so that it may cool and open contacts 109 in readiness for the next operation. It is noted that closure of contacts 115 provides a path around the contacts 109 to maintain the relay in this position until the clamp is lowered, whereupon switches 106 and 107 open, relay 112 is returned to normal, and motor 28 is again connected to the line through contacts 114 and 115.

In either of the above controls the operator need not be concerned about the servomotor as it is shut-off automatically after a predetermined period of non-use of the machine.

While this invention has been illustrated herein as being applied to a buttonhole machine, it is to be understood that it is not so limited but includes within its scope applications to any sewing machine wherein it is desired to relieve the operator of the greater part of the effort required in manipulating in sequence any of the mechanisms associated with the sewing operation, such as presser lifters, trimmers, and transmitter clutches.

Having thus set forth the nature of the invention, what I claim herein is:

1. Apparatus for operating the mechanism-controlling levers of a sewing machine comprising, in combination, driven drum, a band wrapped around each of said drums, said bands being each connected to the respective mechanism-controlling lever, and manual means for sequentially tightening or loosening the wrap of said bands around said drums to control the torque transmitted by said bands from said drums to said mechanism-controlling levers.

2. In a group-stitch sewing machine having a starting lever and a work-clamp lever, means for operating said levers comprising in combination, two drums, means to continuously rotate said drums, a band wrapped around each of said drums, each band connected at one end to a respective machine lever and at the other end to operating levers, spring biased in a manner normally to tighten the band on one drum and to loosen the band on the other drum, equalizer means connected to both operating levers, and a single treadle connected to said equalizer means whereby the tight band may be loosened and the loose band may be tightened by movement of said single treadle.

3. In a group-stitch sewing machine having a starting lever and a work-clamp lever, means for operating said levers comprising in combination, a first drum and a second drum, means for continuously rotating said drums, a first band wrapped around said first drum, a second band wrapped around said second drum, said first band being connected at one end to the work-clamp lever and at the other end to a lever spring biased in a manner to tighten the band on the drum, said second band being connected at one end to the starting lever and at the other end to a lever, spring biased in a manner to loosen the band on the drum, equalizer means connected to both levers, and a single treadle connected to said equalizer means whereby the tight band may be loosened and the loose band may be tightened about its respective drum by movement of said single treadle.

4. In a group-stitch sewing machine, a work-clamp, a work-support, a spring for urging said clamp towards said work-support, a lever for raising said work-clamp, a drum, means for imparting continuous rotation to said drum, a band wrapped around said drum and connected at one end to said clamp lever, a second lever connected at one end to the opposite end of said band and at the other end to a loading spring which acts to tighten the band on the drum, whereby to transmit torque from the drum to the clamp lever to raise said clamp, and means for moving said second lever against the force of said loading spring to lower said clamp.

5. In a group-stitch sewing machine, in combination, a work-clamp, a starting lever, a motor, drums driven by said motor, bands wrapped around said drums and connected respectively to said work-clamp and starting lever, means for tightening or loosening the wrap of the bands around said drums whereby to control said work-clamp and starting lever, and means for shutting off the drum driving motor after the lapse of a predetermined time with the clamp in its raised position.

6. In a group-stitch sewing machine having a starting lever and a work-clamp lever, in combination, an electric motor, a speed reducer connected to said motor and providing two output shafts, a drum mounted for rotation with each shaft, a band wrapped around each drum and operatively connected at one end respectively to said starting lever and to said work-clamp, two operating levers connected respectively to the opposite ends of said bands, loading springs for normally biasing said levers to loosen one band about its drum and to tighten the other band about its drum, an equalizer link connected to said operating levers, and single treadle means for moving said equalizer link to provide movement for said levers whereby to loosen one band about its drum and to tighten the other band about its drum.

7. In a group-stitch sewing machine having a starting lever and a work-clamp lever, in combination, an electric motor, a speed reducer connected to said motor and providing two output shafts, a drum mounted for rotation with each shaft, a band wrapped around each drum and operatively connected at one end respectively to said starting lever and to said work-clamp, two operating levers connected respectively to the opposite ends of said bands, loading springs for normally biasing said levers to loosen one band about its drum and to tighten the other band about its drum, an equalizer link connected to said operating levers, a single treadle connected to said equalizer link, and latch means interconnecting said operating levers to prevent simultaneous operation thereof responsively to movement of said single treadle.

8. In a group-stitch sewing machine having a starting lever and a work-clamp, a servo mechanism for operating said starting lever and work-clamp responsively to the movements of a single treadle, comprising two drums mounted for continuous rotation, a band wrapped around each drum and operatively connected at one end to the respective starting lever and work-clamp, operating levers connected to the opposite end of each of said respective bands and means interconnecting said operating levers whereby movement of a single treadle provides sequential movement of said levers to apply and remove operating torques from said drums to said starting lever and said work-clamp.

9. Apparatus for operating the work-clamp of a group-stitch sewing machine comprising a motor-driven drum, a band wrapped around said drum and operatively connected at one end to said work-clamp, the other end being spring biased to normally tighten said band around said drum, and manual means for counteracting said spring bias to permit the loosening of said band on its drum.

10. In a group-stitch sewing machine having a starting lever spring biased to a stop position, means for operating said starting lever comprising a drum, means for imparting continuous rotation to said drum, a band wrapped around said drum and connected at one end to said starting lever, a second lever connected at one end to the opposite end of said band and at the same end to a loading spring which acts to loosen the band on the drum, and means for moving said second lever against the force of said loading spring whereby to transmit torque from the drum to the starting lever to move same against its spring bias to start the machine.

11. Apparatus for operating the mechanism-controlling levers of a sewing machine comprising, in combination, torque-supplying means and manual means for rendering said torque-supplying means effective to actuate said mechanism-controlling levers, including means for controlling the amount of torque transmitted to said levers from said torque supplying means.

12. The combination with a sewing machine having mechanism-controlling levers, of a servo control means comprising an electric motor for supplying torque, friction means for transmitting the torque from said motor to said levers, and means for manually modifying said friction means for controlling the amount of the torque transmitted.

FRANK A. HAYES.

No references cited.